United States Patent
Lum

(10) Patent No.: US 7,654,446 B2
(45) Date of Patent: Feb. 2, 2010

(54) MONITOR WITH INTERCHANGEABLE BASE FOR POINT-OF-SALE APPLICATIONS

(75) Inventor: Jackson Lum, Roslyn, NY (US)

(73) Assignee: Logic Controls, Inc., New Hyde Park, NJ (US)

( * ) Notice: Subject to any disclaimer, the term of this patent is extended or adjusted under 35 U.S.C. 154(b) by 245 days.

(21) Appl. No.: 11/241,735

(22) Filed: Sep. 30, 2005

(65) Prior Publication Data

US 2006/0065724 A1 Mar. 30, 2006

Related U.S. Application Data

(60) Provisional application No. 60/615,384, filed on Sep. 30, 2004.

(51) Int. Cl.
*G07F 19/00* (2006.01)

(52) U.S. Cl. ........................ 235/379; 235/381; 235/383

(58) Field of Classification Search .................. 235/379, 235/381, 383
See application file for complete search history.

(56) References Cited

U.S. PATENT DOCUMENTS

| | | | |
|---|---|---|---|
| 5,594,920 A | 1/1997 | Ebina et al. | |
| 5,707,162 A | 1/1998 | Kasai et al. | |
| 5,794,214 A | 8/1998 | Ebina et al. | |
| 5,808,283 A | 9/1998 | Stanton et al. | |
| 5,941,618 A | 8/1999 | Cheng | |
| 6,003,008 A | 12/1999 | Postrel et al. | |
| 6,053,410 A | 4/2000 | Wike, Jr. et al. | |
| 6,053,412 A * | 4/2000 | Wike et al. ............. | 235/462.43 |
| 6,705,520 B1 | 3/2004 | Pitroda et al. | |
| 6,729,242 B2 | 5/2004 | Kerber | |
| 6,769,607 B1 | 8/2004 | Pitroda et al. | |
| 2003/0132292 A1* | 7/2003 | Gomez et al. ............... | 235/383 |
| 2004/0181453 A1 | 9/2004 | Ray et al. | |

OTHER PUBLICATIONS

TOM-XV Series, 15" LCD Touchmonitor, Pioneerpos, Inc., p. 1 (2004).
AIO-XV Series, 15" All-in-One Touchscreen System, Pioneerpos, Inc., p. 1 (2004).
PXI Series, All-in-One Touch System, Pioneerpos, Inc., p. 1 (2004).
JIVA 5800, Thick-Client Terminal Solutions, Posiflex Business Machines, Inc.., pp. 1-4 (2002).
NCR RealPOS™ 62 Workstation, NCR Corporation, pp. 1-2 (2003).
Beetle POS Family Beetle/iPOS, Wincor Nixdorf International GmbH, pp. 1-2 (2003).

* cited by examiner

*Primary Examiner*—Karl D. Frech
(74) *Attorney, Agent, or Firm*—Hoffman & Baron, LLP

(57) ABSTRACT

A point-of-sale system includes a monitor and interchangeable bases. The monitor includes a display and a connecting member. The interchangeable bases receive the connecting member and are selectively removable therefrom. A point-of-sale monitor includes a display and a connecting member. The connecting member is received by each of a plurality of interchangeable bases and selectively removable therefrom. A plurality of interchangeable bases for a point-of-sale system include a receiving area for a point-of-sale monitor, and a mounting device to removably attach the interchangeable base to the monitor. A method of displaying point-of-sale information includes providing a monitor with a display and connecting member coupled thereto, adapting the interchangeable bases to receive the connecting member, and adapting the interchangeable bases to be selectively removable from the connecting member.

16 Claims, 9 Drawing Sheets

MONITOR WITH INTERCHANGEABLE BASE FOR POINT-OF-SALE APPLICATIONS

CROSS REFERENCE TO RELATED APPLICATION

This application claims the benefit of U.S. Provisional Application No. 60/615,384 filed on Sep. 30, 2004, the disclosure of which is incorporated herein by reference.

BACKGROUND OF THE INVENTION

1. Field of the Invention

The present invention generally relates to point-of-sale (POS) terminal systems, and more particularly to providing an interchangeable base in a POS terminal system.

2. Description of the Related Art

Point-Of-Sale (POS) terminal systems are commonly used in retail stores, supermarkets, and restaurants for sales transactions. In a typical terminal system, popular components include a cash drawer, receipt printer, credit card reader, bar code reader, monitor, customer display, POS keyboard, touch screen monitor, and computer. However, In most POS customer service areas, counter space is limited.

Therefore, although it may be advantageous to integrate several components into one compact unit, a high degree of integration has at least one drawback. Specifically, different components have different usable life spans. Therefore, a single outdated component can render the entire system obsolete even if the remaining components are perfectly functional and up-to-date. In an integrated POS terminal system, the computer provides an excellent example of a component that is readily outdated.

A conventional All-In-One or integrated POS terminal system 10, in which each of the components is integrated into a single assembly, is shown in FIG. 1. The display is often a touch screen Liquid Crystal Display monitor (LCD) 12. The electronics required to power and drive the touch screen monitor 12 are generally housed behind the display 16.

An important component of the integrated terminal system 10 is the computer (not shown). In FIG. 1, the computer is located either inside a base 14 or in a rear portion of the terminal housing 16. In either case, the computer is an integral part of the system and it is not separable from the remaining assembly to enable the computer to be, for example, upgraded to a more powerful computer.

Thus, there is a need in the field of POS terminal systems for an alternative that would provide the advantages of conventional integrated POS terminal systems, which include many essential components, while addressing the limitation of rendering an entire system obsolete with a single outdated component, such as the computer. In addition, there is a need to improve flexibility in customizing the features of an integrated POS terminal system.

SUMMARY OF THE INVENTION

These and other goals, purposes, and objectives are met by the present invention that provides a point-of-sale system, which includes a monitor and a plurality of interchangeable bases. The monitor includes a display. Each of the plurality of interchangeable bases is adapted to receive at least a portion of the monitor and to be selectively removable from the monitor.

The interchangeable bases may be adapted to house a processing device, which includes at least one of a computer, microprocessor, microcontroller, application specific integrated circuit (ASIC), and programmable logic device. The interchangeable bases may be adapted to house electrical connections associated with the monitor, and the system may include at least one of a magnetic strip reader (MSR), customer display, speaker, fingerprint verifier, printer, bar code reader, cash drawer, keyboard, and mouse operatively coupled to at least one of the monitor and interchangeable base.

The present invention also provides a point-of-sale monitor, which includes a display and a receiving area. At least a portion of the receiving area is adapted to be received by each of a plurality of interchangeable bases. The receiving area is adapted to be selectively removable from each of the plurality of interchangeable bases.

The present invention further provides a plurality of interchangeable bases for a point-of-sale system, each of which includes a receiving area adapted to receive at least a portion of a point-of-sale monitor, and a mounting device adapted to removably attach the interchangeable base to the point-of-sale monitor. At least one of the plurality of interchangeable bases may be adapted to house a processing device, which includes at least one of a computer, microprocessor, microcontroller, application specific integrated circuit (ASIC), and programmable logic device. At least one of the plurality of interchangeable bases may be adapted to house electrical connections associated with a monitor.

The present invention still further provides a method of displaying point-of-sale information, which includes providing a monitor comprising a display and a receiving area, adapting each of a plurality of interchangeable bases to receive at least a portion of the receiving area, and adapting each of the plurality of interchangeable bases to be selectively removable from the receiving area. The method may include adapting least one of the plurality of interchangeable bases to house a processing device, and adapting at least one of the plurality of interchangeable bases to house electrical connections associated with the monitor.

These and other objectives, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
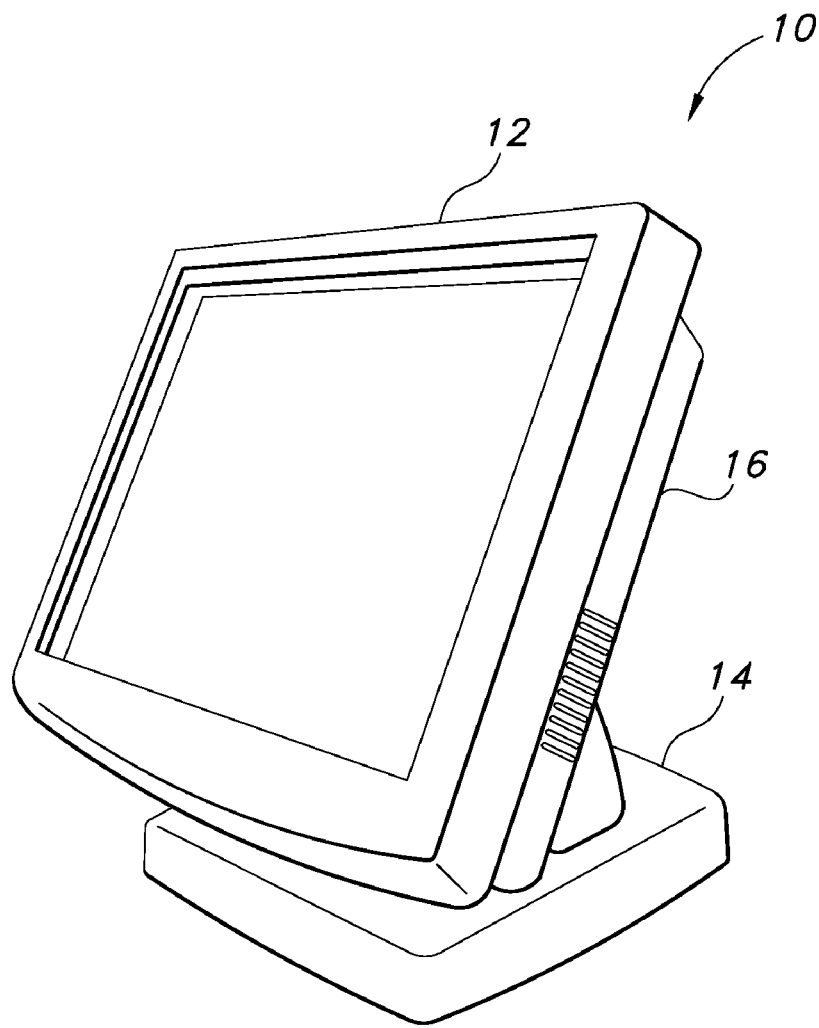
FIG. 1 is a perspective view of a conventional point-of-sale integrated terminal system.
Figure 2:
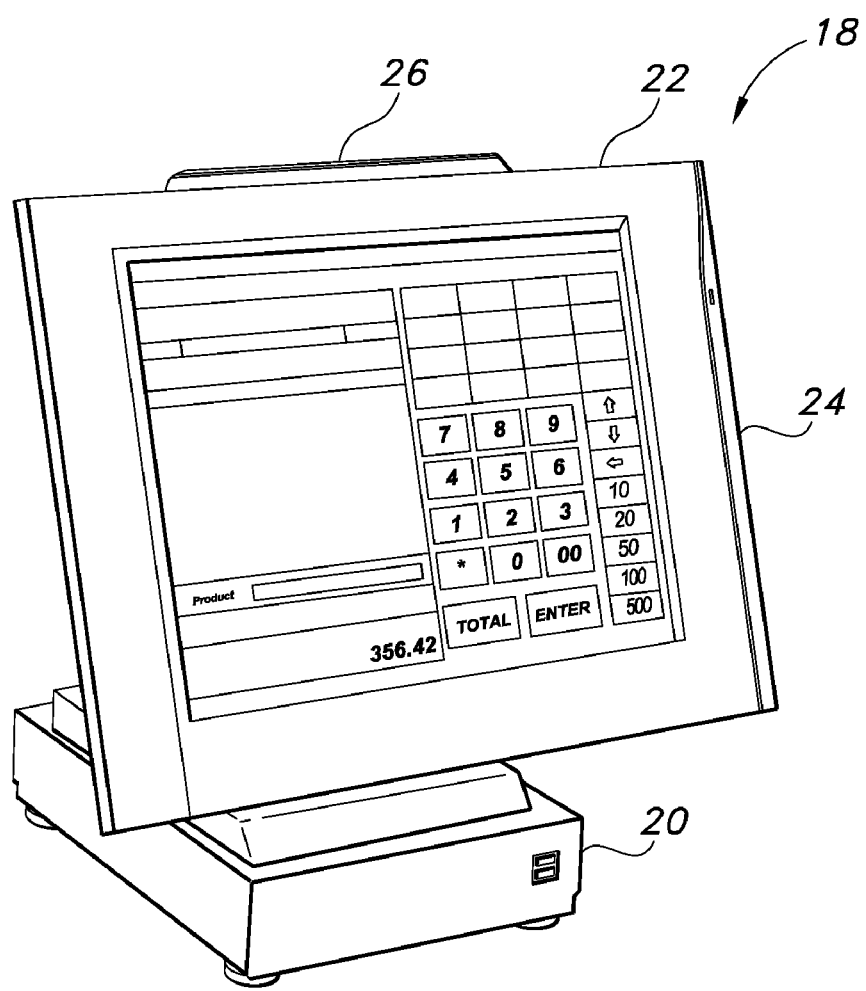
FIG. 2 is a perspective view of an integrated terminal system with an interchangeable base in accordance with the present invention.

In accordance with the present invention, FIG. 2 shows a first embodiment of an integrated point-of-sale (POS) terminal system 18 with a removable and/or interchangeable computer base 20. An upper section of the system 18 preferably includes a touch screen LCD monitor 22, a credit card reader 24 which is preferably located on the right-hand side of the monitor 22, and a customer display 26, which is preferably mounted on the rear side of the LCD monitor and is only partially visible near the top of the monitor 22.

Figure 3:
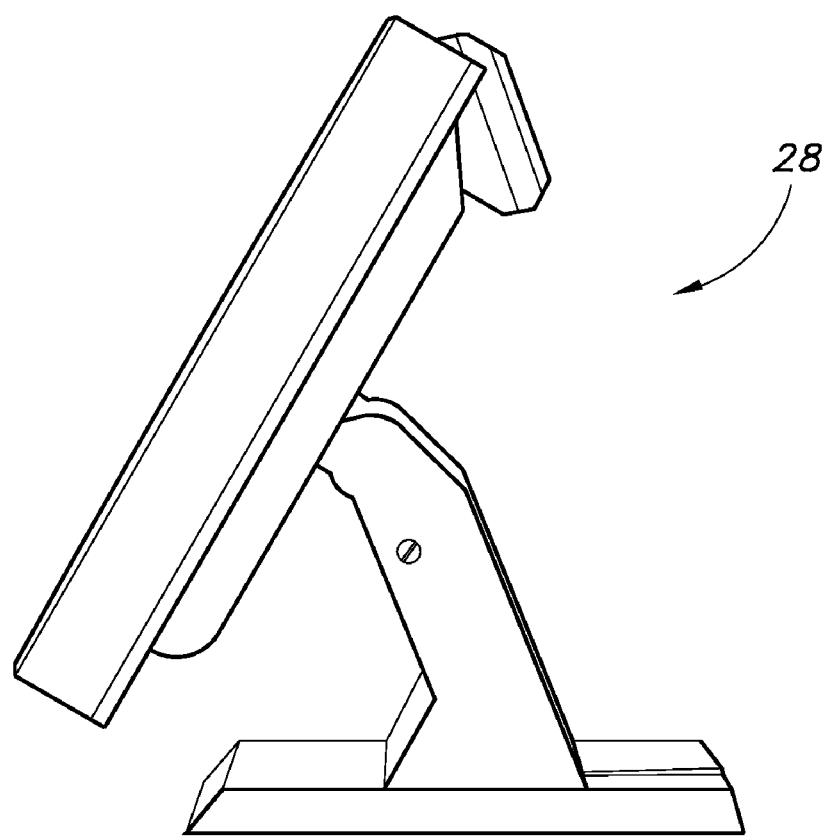
FIG. 3 is a side view of a monitor shown in FIG. 2.

The lower section of the system 18 includes the readily detachable computer housing or interchangeable base 20. The upper section 28 of the system 18 shown in FIG. 3, and the lower section 30 is shown in FIG. 4 detached from each other.

Figure 4:
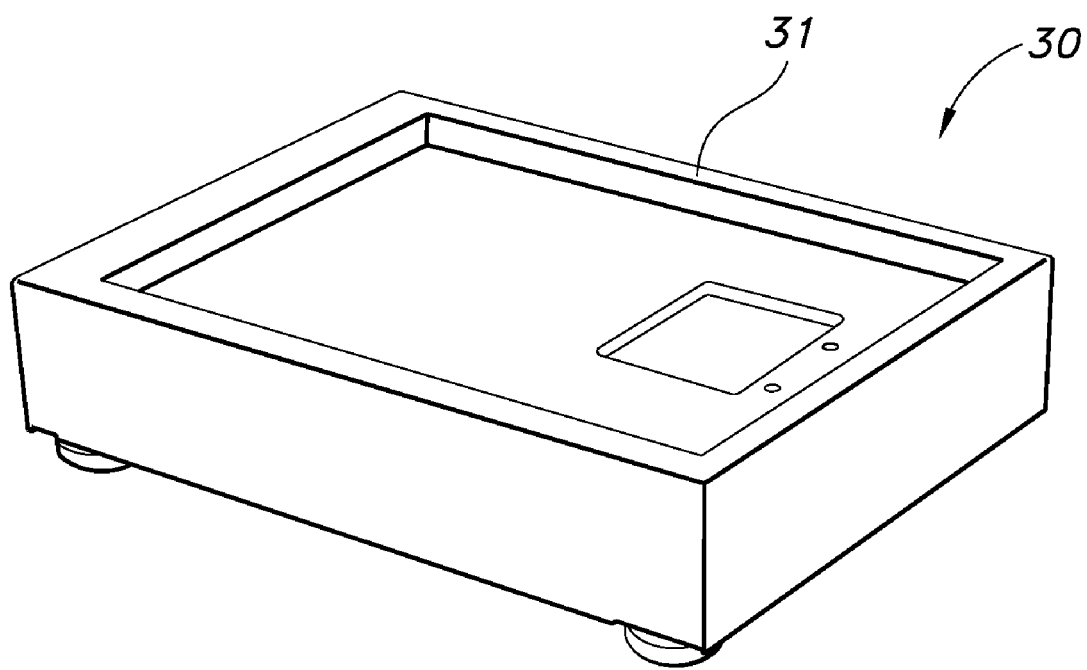
FIG. 4 is a perspective view of an interchangeable base shown in FIG. 2.
Figure 5:
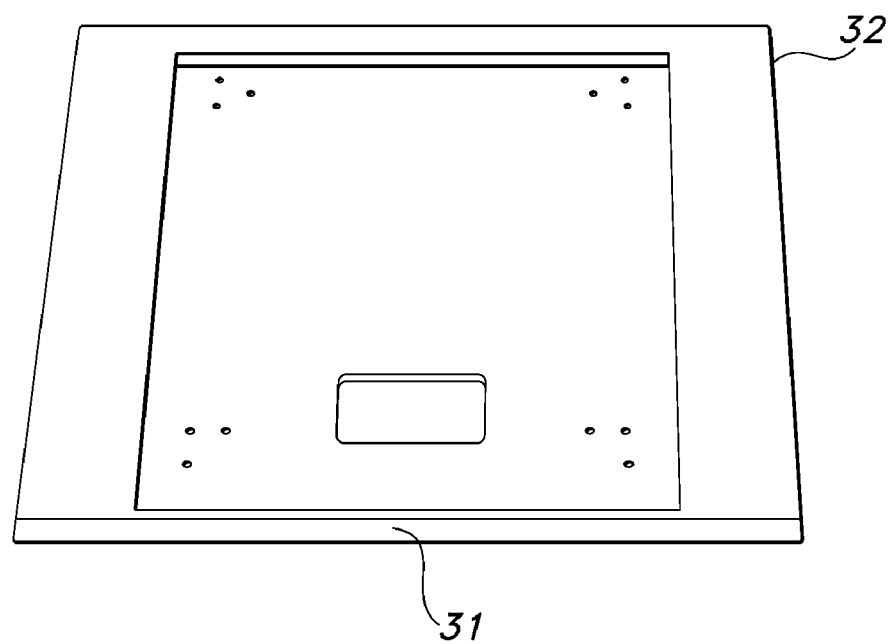
FIG. 5 is a perspective view of a second embodiment of the interchangeable base shown in FIG. 4.
Figure 6:
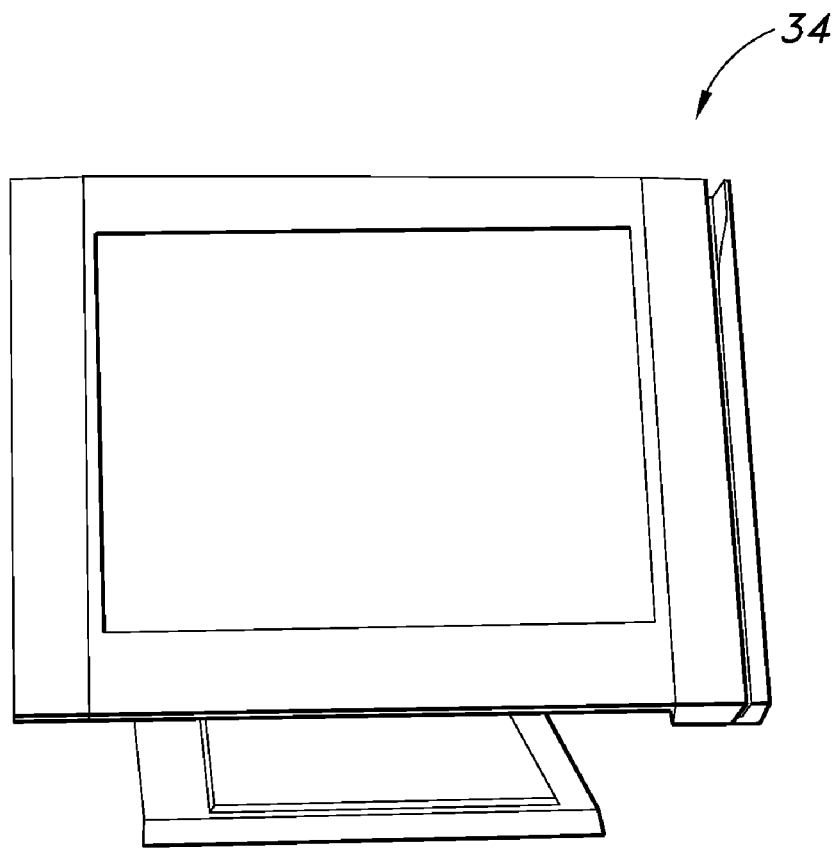
FIG. 6 is a perspective view of a second embodiment of the integrated terminal system with interchangeable base shown in FIG. 2.
Figure 7:
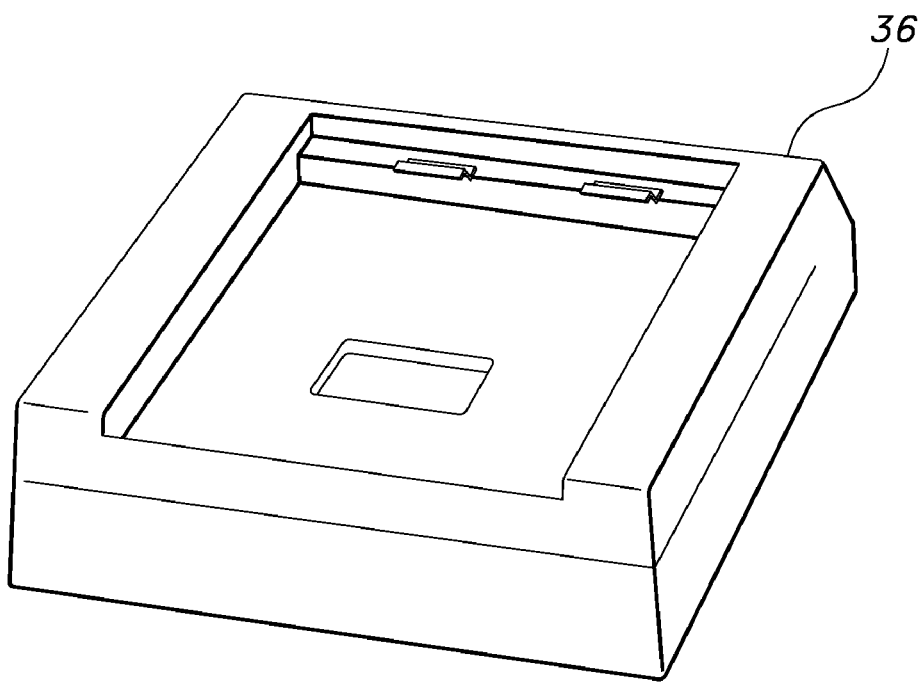
FIG. 7 is a perspective view of a third embodiment of the interchangeable base shown in FIG. 4.
Figure 8:
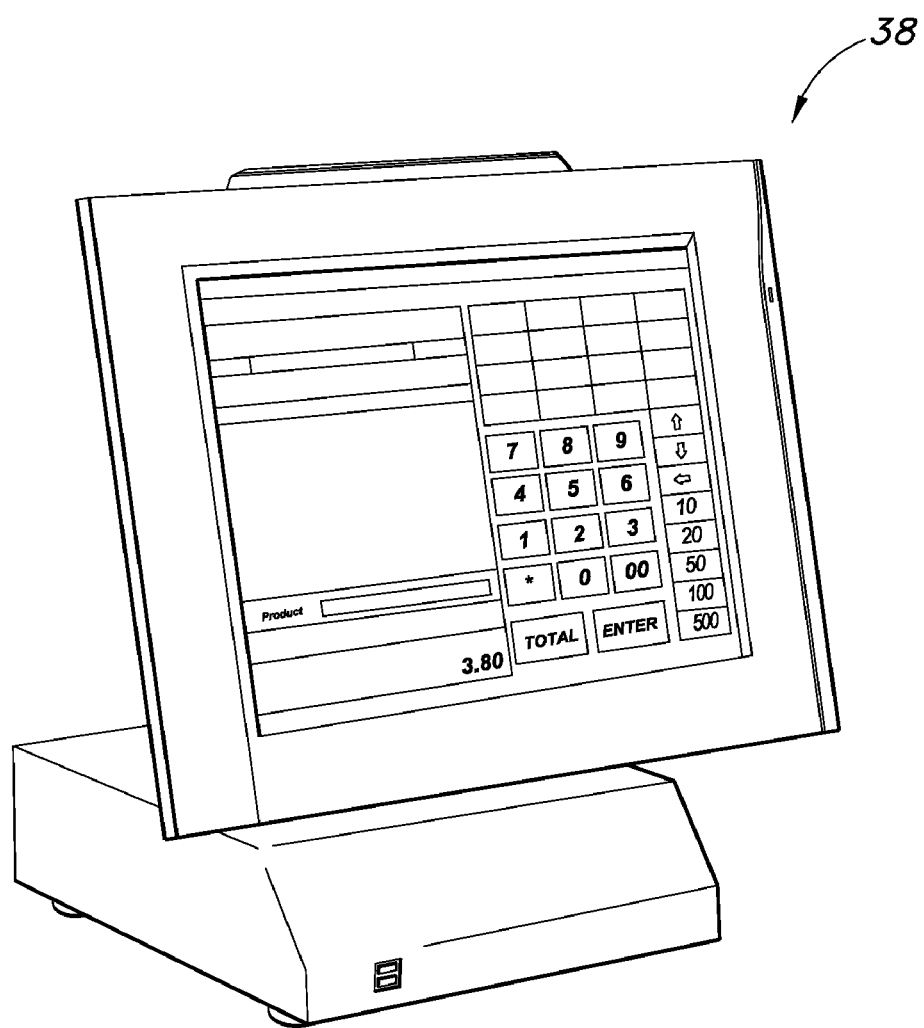
FIG. 8 is a perspective view of a third embodiment of the integrated terminal system with interchangeable base shown in FIG. 1.

The interchangeable base 20, which is preferably used to enclose the computer (not shown) is shown in FIG. 4 and can be replaced with different bases, such as those shown in FIGS. 5 and 7, to achieve different dimensions, functionality, and/or performance. For example, if a simple passive base 32 shown in FIG. 5 is used, a simple terminal system 34 shown in FIG. 6, which is a basic touch screen monitor 34, can be achieved. Alternatively, if a more powerful computer requires a larger active base 36 shown in FIG. 7, a high-performance terminal system 38 shown in FIG. 8 is achieved.

The interchangeable base 20 may incorporate an opening 31 to permit cabling and other connections to be made between the upper and lower sections of the POS terminal system or to merely enable the connections to pass through the interchangeable base 20. The interchangeable base 20 preferably performs the following functions:
1. It encloses a computer board, which is preferably used as a central processing unit (CPU) for the POS terminal system. The computer board or processing device preferably includes at least one of computer, microprocessor, microcontroller, application specific integrated circuit (ASIC), and/or programmable logic device.
2. It encloses and anchors all excess cables to the computer board from the monitor, magnetic strip reader (MSR), customer display, speakers, fingerprint verifier, printer, bar code reader, cash drawer, keyboard, mouse, and other peripherals that may be associated with and/or integrated in the POS terminal system.
3. It facilitates and simplifies the serviceability of the POS terminal system. Accordingly, by removing all the attached cables and only one or more screws, the entire computer unit can be detached for repair, upgrade or relocation.
4. Interface cables from the monitor and attached peripherals preferably enter the interchangeable base through the opening in the top surface of the base. Interface cables from other peripherals preferably enter the base through a bottom and/or rear opening (not shown).
5. The front side of the adapter base unit can support all the computer user interface functions, such as a power on/off switch, reset switch, power on indicator, hard drive activity indicator, beeper, and universal serial bus (USB) ports.

The interchangeable base is particularly advantageous since it substantially overcomes problems associated with variations in the useful life of different components integrated in the POS terminal system. For example, the user may upgrade or downgrade the computer associated with the terminal system while continuing to use the same touch screen monitor, which typically has a much longer usable life than the computer.

Figure 9:
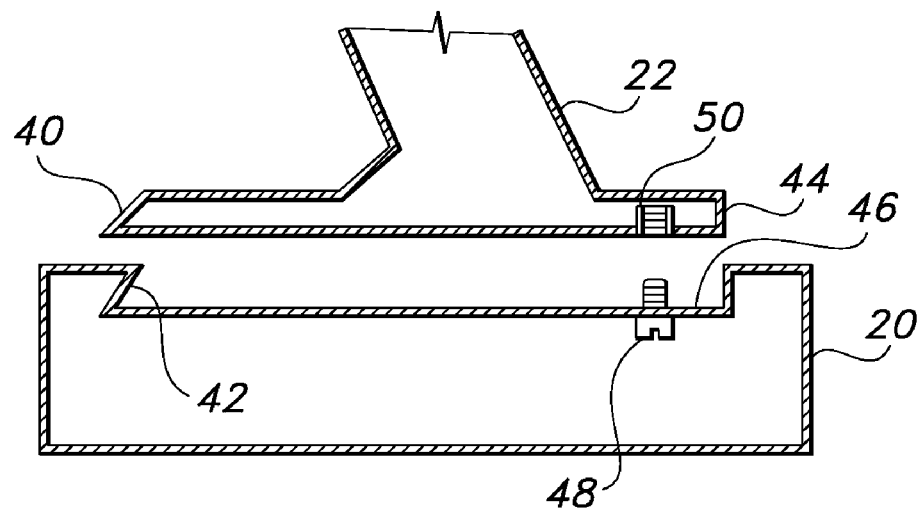
FIG. 9 is a side view showing a first embodiment of a method for mounting the monitor to the interchangeable base in accordance with the present invention.
Figure 10:
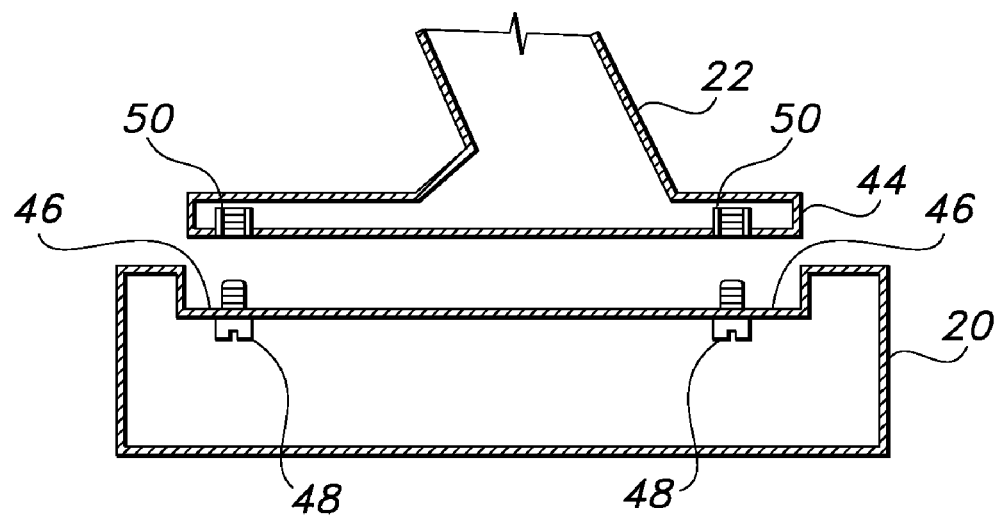
FIG. 10 is a side view showing a second embodiment of a method for mounting the monitor to the interchangeable base in accordance with the present invention.

Two embodiments of methods for attaching the monitor 22 to the interchangeable base 20 are shown in FIGS. 9 and 10. In the first embodiment shown in FIG. 9, a tapered base edge 40 of the monitor 22 is preferably slid into a tapered recess 42 in the interchangeable base 20. A front base portion 44 is then preferably lowered into a straight recess 46 in the interchangeable base 20. The monitor 22 and interchangeable base 20 are then preferably fastened together using a screw 48 and a mating nut 50. The first mounting method provides the minimum number of screws required to attach the monitor 22 to the interchangeable base 20.

A second embodiment is shown in FIG. 10, in which no tapered edges are used and the monitor 22 is placed into two straight recesses 46 in the interchangeable base 20. Two to four mounting screws 48 and nuts 50 are preferably used to attach the monitor 22 to the interchangeable base 20 in the second embodiment. The second embodiment provides the advantages of simplicity and lower cost in tooling.

Accordingly, the advantages provided by the integrated POS terminal system with the interchangeable base in accordance with the present invention include the following:
1. The system substantially reduces problems associated with obsolescence. For example, in the simplest configuration, the terminal system may be downgraded to a useful touch screen monitor with a simple passive base as shown in FIG. 6.
2. As future applications impose different requirements, such as a more powerful CPU, a different or larger base can be used, if required.
3. The interchangeable base can be redesigned to accommodate different footprints or styles to match and/or complement additional physical requirements, thus providing complete flexibility concerning variations in the shape, style, and/or dimensions of the system footprint.

Although illustrative embodiments of the present invention have been described herein with reference to the accompanying drawing, it is to be understood that the invention is not limited to those precise embodiments, and that various other changes and modifications may be affected therein by one skilled in the art without departing from the scope or spirit of the invention.

What is claimed is:
1. A point-of-sale (POS) system comprising:
a monitor having a base section supporting a display; and
a plurality of interchangeable bases configured for POS applications, each of the plurality of interchangeable bases being configured to receive at least a portion of the same monitor, each of the plurality of interchangeable bases being configured to be attached to the same monitor and detached from the same monitor, each of the plurality of interchangeable bases being configured to house a processing device with a different performance, each of the plurality of interchangeable bases including a recessed area on a top surface thereof, the base section of the monitor being configured to mate with, and be affixed to, the recessed area of each of the plurality of interchangeable bases so that the base section nests within the recessed area.
2. The point-of-sale system defined by claim 1, wherein at least one of the plurality of interchangeable bases comprises an opening adapted to enable a cable connected to the monitor to pass therethrough to an interior of the at least one of the plurality of interchangeable bases.

3. The point-of-sale system defined by claim 1, wherein the processing device comprises at least one of a computer, microprocessor, microcontroller, application specific integrated circuit (ASIC), and programmable logic device.

4. The point-of-sale system defined by claim 1, wherein at least one of the interchangeable bases is adapted to house electrical connections associated with the monitor.

5. The point-of-sale system defined by claim 1, further comprising at least one of a magnetic strip reader (MSR), customer display, speaker, fingerprint verifier, printer, bar code reader, cash drawer, keyboard, and mouse operatively coupled to at least one of the monitor and at least one of the plurality of interchangeable bases.

6. A point-of-sale monitor comprising:

a display; and a receiving area, the receiving area being configured to be received by each of a plurality of interchangeable bases configured for POS applications, the receiving area being configured to be selectively attached to each of the plurality of interchangeable bases and detached from each of the plurality of interchangeable bases, the receiving area being configured to mate with, and be affixed to, a recessed area on a top surface of each of the plurality of interchangeable bases so that the receiving area nests within the recessed area, each of the plurality of interchangeable bases being configured to house a processing device with a different performance.

7. The point-of-sale monitor defined by claim 6, wherein at least one of the plurality of interchangeable bases comprises an opening adapted to enable a cable connected to the monitor to pass therethrough to an interior of the at least one of the plurality of interchangeable bases.

8. A plurality of interchangeable bases for a point-of-sale system, each of plurality of interchangeable bases comprising:

a receiving area configured to receive at least a portion of a point-of-sale monitor, the receiving area being recessed with respect to a top surface of each of the plurality of interchangeable bases, the point-of-sale monitor having a base section supporting a display and being configured to mate with, and be affixed to, the receiving area of each of the plurality of interchangeable bases so that the base section nests within the receiving area, each of the plurality of interchangeable bases being configured to house a processing device with a different performance; and a mounting device configured to selectively attach and detach each of the plurality of interchangeable bases to the same point-of-sale monitor.

9. The plurality of interchangeable bases for a point-of-sale system defined by claim 8, wherein the processing device comprises at least one of a computer, microprocessor, microcontroller, application specific integrated circuit (ASIC), and programmable logic device.

10. The plurality of interchangeable bases for a point-of-sale system defined by claim 7, wherein at least one of the interchangeable bases is adapted to house electrical connections associated with a monitor.

11. The plurality of interchangeable bases for a point-of-sale system as defined by claim 8, wherein at least one of the plurality of interchangeable bases comprises an opening adapted to enable a cable connected to the monitor to pass therethrough to an interior of the at least one of the plurality of interchangeable bases.

12. A method of displaying point-of-sale (POS) information comprising:

providing a monitor comprising a display and a receiving area;

adapting each of a plurality of interchangeable bases to be selectively attachable to at least a portion of the receiving area, each of the plurality of interchangeable bases being configured for POS applications and including a recessed area on a top surface thereof, the receiving area of the monitor configured to mate with, and be affixed to, the recessed area of each of the plurality of interchangeable bases so that the receiving area nests within the recessed area;

adapting the interchangeable bases to be selectively detachable from the receiving area; and configuring each of the plurality of interchangeable bases to house a processing device with a different performance.

13. The method of displaying point-of-sale information defined by claim 12, further comprising providing the processing device as at least one of a computer, microprocessor, microcontroller, application specific integrated circuit (ASIC), and programmable logic device.

14. The method of displaying point-of-sale information defined by claim 12, further comprising adapting at least one of the interchangeable bases to house electrical connections associated with the monitor.

15. The method of displaying point-of-sale information defined by claim 12, further comprising operatively coupling at least one of a magnetic strip reader (MSR), customer display, speaker, fingerprint verifier, printer, bar code reader, cash drawer, keyboard, and mouse to at least one of the monitor and the interchangeable base.

16. The method of displaying point-of-sale information defined by claim 12, wherein at least one of the plurality of interchangeable bases comprises an opening adapted to enable a cable connected to the monitor to pass therethrough to an interior of the at least one of the plurality of interchangeable bases.

* * * * *